United States Patent
Nakamura et al.

(10) Patent No.: US 8,696,050 B2
(45) Date of Patent: Apr. 15, 2014

(54) SIDE VEHICLE BODY STRUCTURE

(75) Inventors: Hayato Nakamura, Hamamatsu (JP); Junji Suzuki, Hamamatsu (JP)

(73) Assignee: Suzuki Motor Corporation (JP)

( * ) Notice: Subject to any disclaimer, the term of this patent is extended or adjusted under 35 U.S.C. 154(b) by 78 days.

(21) Appl. No.: 13/082,576

(22) Filed: Apr. 8, 2011

(65) Prior Publication Data

US 2011/0254317 A1    Oct. 20, 2011

(30) Foreign Application Priority Data

Apr. 16, 2010    (JP) ................................. 2010-094950

(51) Int. Cl.
 *B62D 25/04*    (2006.01)
 *B60R 22/24*    (2006.01)

(52) U.S. Cl.
 USPC ............ 296/193.06; 296/203.04; 296/193.08; 296/193.05; 296/30; 280/801.2

(58) Field of Classification Search
 USPC .................... 296/193.05, 193.06, 30, 203.04; 280/801.2
 See application file for complete search history.

(56) References Cited

U.S. PATENT DOCUMENTS

| | | | | |
|---|---|---|---|---|
| 6,086,100 | A * | 7/2000 | Corporon et al. | 280/808 |
| 7,364,225 | B2 * | 4/2008 | Tomioka | 296/203.04 |
| 2007/0138837 | A1 | 6/2007 | Tomioka | |

FOREIGN PATENT DOCUMENTS

| | | |
|---|---|---|
| DE | 19735640 A1 | 2/1999 |
| JP | 06-156316 | 6/1994 |
| JP | 6-69026 | 9/1994 |
| JP | 6-69026 U | 9/1994 |
| JP | 2003127900 A | 5/2003 |
| JP | 2007062695 A | 3/2007 |
| JP | 2007-296890 | 11/2007 |
| JP | 2007296890 A | 11/2007 |
| JP | 2008-062748 | 3/2008 |
| JP | 2008062748 A | 3/2008 |
| JP | 2008-143211 | 6/2008 |
| JP | 2008-238885 | 10/2008 |
| JP | 2009-241779 | 10/2009 |

OTHER PUBLICATIONS

First Chinese Office Action corresponding to Chinese Application No. 201110094724.3 issued Jul. 25, 2012.
Second Chinese Office Action corresponding to Chinese Application No. 201110094724.3 issued Apr. 3, 2013.
German Office Action corresponding to German Application No. 10 2011 017 139.8 issued Nov. 9, 2012.
Japanese Office Action corresponding to Japanese Application No. 2010-094950 dated Feb. 14, 2014.

\* cited by examiner

*Primary Examiner* — Glenn Dayoan
*Assistant Examiner* — Melissa A Black
(74) *Attorney, Agent, or Firm* — Myers Bigel Sibley & Sajovec, P.A.

(57) ABSTRACT

In a side vehicle body structure of a vehicle, which is provided with a shoulder anchor part 2 for a seat belt, a shoulder reinforcement 9 of the shoulder anchor part 2 extends to the joint portion of a side body outer panel 7 and a quarter panel 8, and the shoulder reinforcement 9, the side body outer panel 7, and the quarter panel 8 are jointed together in the state in which the three elements are lapped together.

1 Claim, 2 Drawing Sheets

SIDE VEHICLE BODY STRUCTURE

CROSS-RELATED APPLICATIONS

This application claims priority from Japanese Patent Application No. 2010-094950; filed Apr. 16, 2010, the disclosure of which is incorporated herein by reference in its entirety.

BACKGROUND OF THE INVENTION

The present invention relates to a side vehicle body structure, and more particularly, relates to a side vehicle body structure of a vehicle, which is provided with a shoulder anchor part for a seat belt.

In a side vehicle body structure of a general vehicle, as seat belt attachment parts, a shoulder anchor part and a retractor anchor part are provided, and the shoulder part is provided on a quarter panel made of a thin sheet. A vehicle having such a side vehicle body structure is configured so that, when a load is applied from the vehicle front, the side vehicle body structure receives a high load applied to the shoulder anchor part and the retractor anchor part. However, the quarter panel made of a thin sheet cannot sustain the load applied to the shoulder anchor part.

Therefore, as described in Patent Document 1, some conventional side vehicle body structure has employed a structure in which a reinforcement having a hut-shaped cross section is attached to the quarter panel on the vehicle outside (between the quarter panel and a side body outer panel) to form a U-shaped closed cross section, whereby the load applied to the shoulder anchor part is sustained.

Also, if a load is applied from the vehicle front, the inertia load of an occupant on a rear seat is received by the seat belt, the shoulder anchor receives a load in the slantwise downward direction of the vehicle front, and the shoulder anchor part is deformed to the vehicle front.

Therefore, as described in Patent Document 2, some conventional side vehicle body structure has secured, due to the quarter panel and a reinforcement (backing metal reinforcement), such a degree of strength that the shoulder anchor is not torn off the side vehicle body. To restrain the quarter panel from being deformed, countermeasures for absorbing the load have been taken by increasing the sheet thickness of the quarter panel to secure the rigidity of the quarter panel itself and by distributing the load by joining the quarter panel to other parts.

Alternatively, as described in Patent Documents 3 and 4, the load has been absorbed by arranging a member throughout in the up-and-down direction of the quarter panel to secure the rigidity of the side vehicle body and by joining the shoulder anchor to the member.

Patent Document 1: JP 2845061 B
Patent Document 2: JP 2007-296890 A
Patent Document 3: JP 2008-62748 A
Patent Document 4: JP 2008-238885 A However, the increase in sheet thickness of the quarter panel as in the above-described conventional side vehicle body structure leads to an increase in the weight of the vehicle body and may exert an adverse effect on the fuel economy of the vehicle.

Also, the addition of a reinforcing part to the quarter panel as in the above-described conventional side vehicle body structures not only leads to an increase in the weight of the vehicle body, but also increases the labor for handling in the assembly process, which may lower the production efficiency.

Furthermore, in Patent Document 1, the structure of the retractor anchor part is not described, and the reinforcement having a hut-shaped cross section is located on the vehicle outside. Therefore, to receive and hold the load applied to the retractor anchor part, a separate part must be provided, which also presents a problem of increased weight of vehicle body and increased number of assembly processes.

SUMMARY OF THE INVENTION

The present invention has been made in view to the above circumstances, and accordingly an object thereof is to provide a side vehicle body structure of a vehicle, which can improve the strength of a shoulder anchor part without increasing the number of parts and the number of assembly processes.

To achieve the above object, the present invention provides a side vehicle body structure of a vehicle, which is provided with a shoulder anchor part for a seat belt, wherein a shoulder reinforcement of the shoulder anchor part extends to the joint portion of a side body outer panel and a quarter panel, and the shoulder reinforcement, the side body outer panel, and the quarter panel are joined together in the state in which the three elements are lapped together.

In the present invention, the shoulder reinforcement is joined to a rear pillar located in the shoulder anchor part.

Also, in the present invention, under the shoulder anchor part, a space is formed on the vehicle inside of the quarter panel by bending and separating the quarter panel toward the vehicle outside, and on the vehicle inside of the space, the rear pillar is provided.

Furthermore, in the present invention, the rear pillar is provided just under the shoulder anchor part.

Furthermore, in the present invention, the rear pillar is curved in a convex shape toward the vehicle front in side view, and by the joint of the rear pillar and the quarter panel, the lower portion of the shoulder anchor part is formed into a closed cross section shape.

As described above, the side vehicle body structure is provided with the shoulder anchor part for a seat belt, and in the side vehicle body, the shoulder reinforcement of the shoulder anchor part extends to the joint portion of the side body outer panel and the quarter panel, and the shoulder reinforcement, the side body outer panel, and the quarter panel are joined together in the state in which the three elements are lapped together. Therefore, the side body outer panel can contribute to the improvement in strength of the shoulder anchor part as a reinforcing member against the load applied to the vehicle front in the shoulder anchor part.

In the present invention, the shoulder reinforcement is joined to the rear pillar located in the shoulder anchor part. Therefore, the thick sheets are joined to each other, so that a location in which the load applied to the shoulder anchor part is received by only the quarter panel made of a thin sheet is eliminated. Thereby, the strength of the shoulder anchor part can be improved greatly.

Also, in the present invention, under the shoulder anchor part, the space is formed on the vehicle inside of the quarter panel by bending and separating the quarter panel toward the vehicle outside, and on the vehicle inside of the space, the rear pillar is provided. Therefore, a retractor anchor part for a seat belt can be provided on the rear pillar, so that the number of parts can be reduced.

Furthermore, in the present invention, the rear pillar is provided just under the shoulder anchor part. Therefore, since the rear pillar serves as a prop, the shoulder anchor part can be prevented from falling when a load is applied to the vehicle front.

Furthermore, in the present invention, the rear pillar is curved in a convex shape toward the vehicle front in side view, and by the joint of the rear pillar and the quarter panel, the lower portion of the shoulder anchor part is formed into a closed cross section shape. Therefore, the load applied to the shoulder anchor part is received by the whole of the front of the lower closed cross section portion, so that the rigidity of the rear pillar can be utilized to the maximum.

DETAILED DESCRIPTION OF PREFERRED EMBODIMENTS

Figure 1:
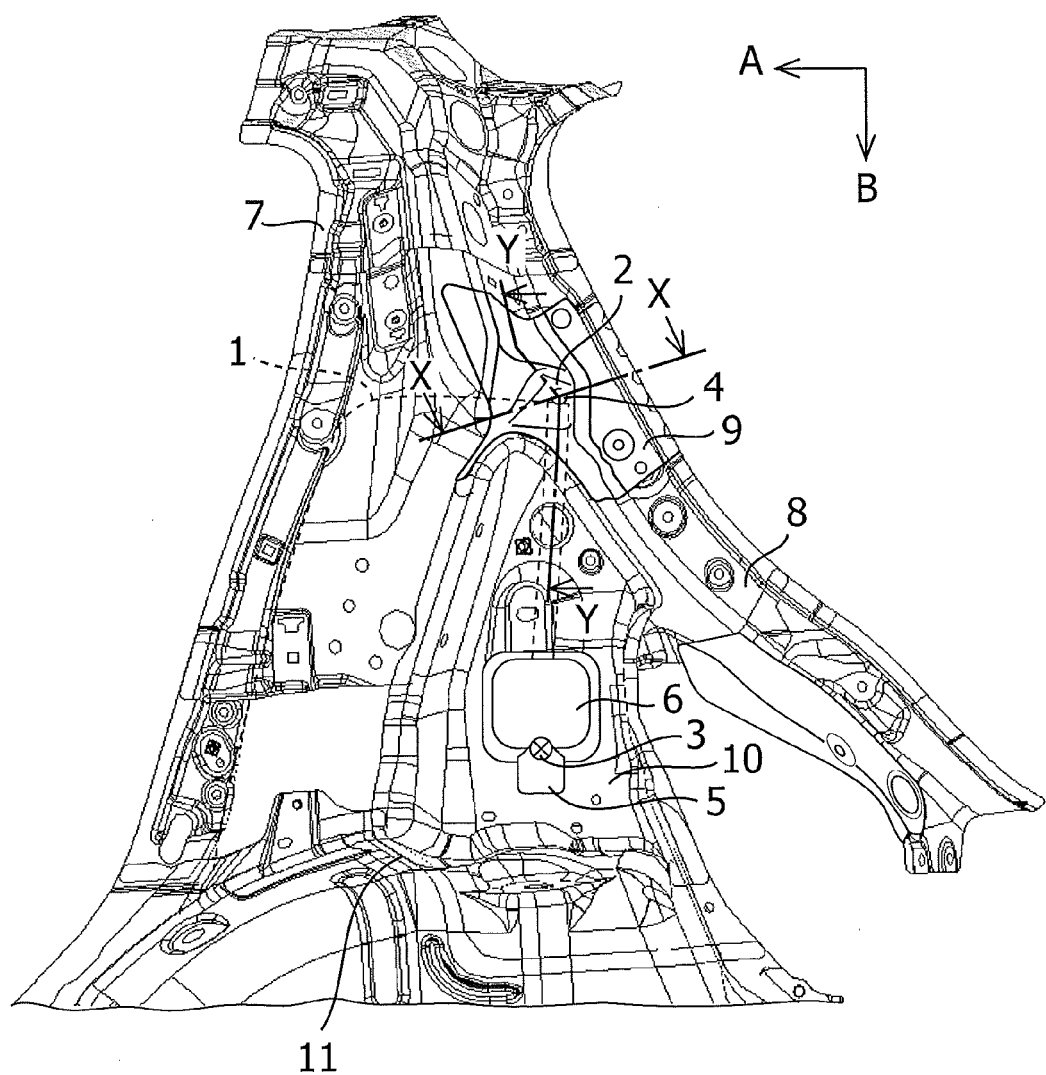
FIG. 1 is a perspective view showing a part of a vehicle body as viewed from the indoor side of a vehicle to which a side vehicle body structure in accordance with an embodiment of the present invention.

The present invention now will be described more fully hereinafter in which embodiments of the invention are provided with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs.

FIGS. 1 to 4 show a side vehicle body structure of a vehicle in accordance with an embodiment of the present invention. In the figures, arrow mark A denotes the vehicle front direction, B denotes the vehicle downward direction, and F denotes the load application direction.

In the side vehicle body structure of a vehicle in accordance with the embodiment of the present invention, as shown in FIGS. 1 to 4, as the attachment parts of a seat belt 1 for an occupant on a rear seat, a shoulder anchor part 2 and a retractor anchor part 3 are provided with an interval being provided therebetween in the up-and-down direction of vehicle. The shoulder anchor part 2 is mounted with a shoulder anchor 4, and the retractor anchor part 3 is mounted with a retractor anchor 5 and a retractor 6.

The shoulder anchor part 2 is provided on a quarter panel 8 made of a thin sheet, which constitutes a vehicle body at the vehicle side together with a side body outer panel 7 on the vehicle outside, and the quarter panel 8 extends along the front-and-rear direction and the up-and-down direction of vehicle. On the back surface side (the side body outer panel 7 side) of the quarter panel 8 on which the shoulder anchor part 2 is provided, a shoulder reinforcement 9 made of a thick sheet for reinforcing the quarter panel 8 is provided.

Figure 2:
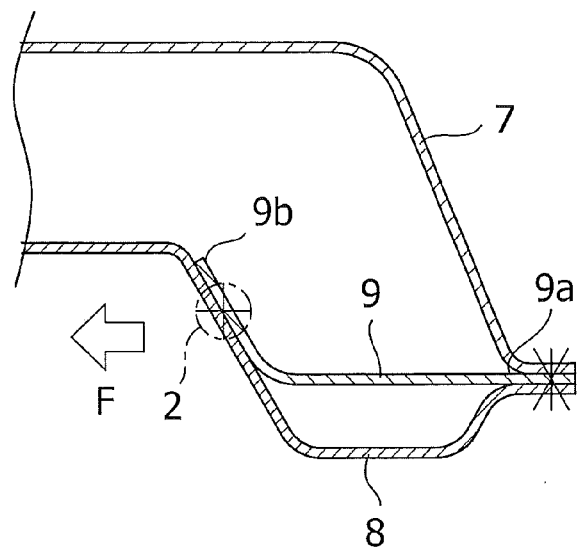
FIG. 2 is a sectional view taken along the line X-X of FIG. 1.

As shown in FIG. 2, a rear end part 9a of the shoulder reinforcement 9 of this embodiment is extended to the joint portion of the side body outer panel 7 and the quarter panel 8, and the rear end part 9a of the shoulder reinforcement 9, the side body outer panel 7, and the quarter panel 8 are joined together by spot welding in the state in which the three elements are lapped together. In the state in which the three elements are lapped together, the rear end part 9a of the shoulder reinforcement 9 is disposed between the side body outer panel 7 and the quarter panel 8. Thereby, the side body outer panel 7 can also be utilized as a strength member.

On the other hand, a front end part 9b of the shoulder reinforcement 9 is bent along the quarter panel 8, and is joined to the quarter panel 8 by spot welding in a state of being lapped on the back surface of the quarter panel 8.

Figure 3:
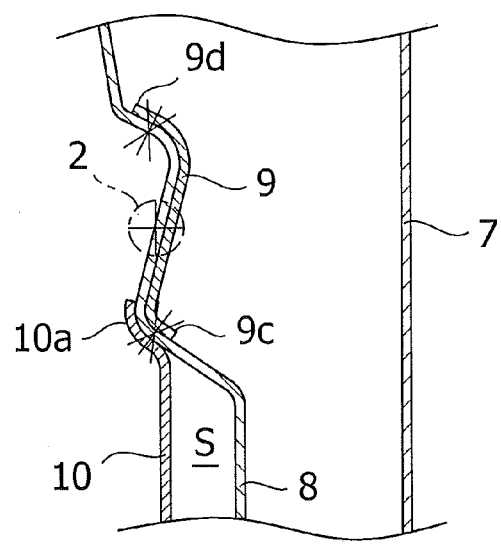
FIG. 3 is a sectional view taken along the line Y-Y of FIG. 1.

Also, as shown in FIG. 3, a lower end part 9c of the shoulder reinforcement 9 of this embodiment is bent along the quarter panel 8, and is joined to an upper end part 10a of a rear pillar 10 made of a thick sheet, which is located in the shoulder anchor part 2, by spot welding in the state in which the three elements are lapped together with the quarter panel 8 being interposed. Thereby, the thick sheets are joined to each other in a location under the shoulder anchor part 2, so that a location in which the load applied to the shoulder anchor part 2 is received by only the quarter panel 8 made of a thin sheet is eliminated. An upper end part 9d of the shoulder reinforcement 9 is bent along the quarter panel 8, and is joined to the quarter panel 8 by spot welding in a state of being lapped on the back surface of the quarter panel 8.

Furthermore, under the shoulder anchor part 2 of this embodiment, as shown in FIG. 3, the quarter panel 8 is bent and separated toward the vehicle outside (the side body outer panel 7 side), whereby a space S is formed on the vehicle inside of the quarter panel 8. On the vehicle inside of this space S, the above-described rear pillar 10 is provided.

The rear pillar 10 is provided just under the shoulder anchor part 2, and is configured so as to function as a prop when the load is applied to the shoulder anchor part 2, so that the shoulder anchor part 2 is prevented from falling. Moreover, the rear pillar 10 is formed so that the side face shape in the front-and-rear direction of vehicle is curved in a chevron shape toward the vehicle front, and by the joint of the rear pillar 10 and the quarter panel 8, the lower portion of the shoulder anchor part 2 is formed into a closed cross section shape. Thereby, the load applied to the shoulder anchor part 2 is received by the whole of the front of the lower closed cross section portion, so that the structure is made such that the rigidity of the rear pillar 10 is utilized to the maximum.

Figure 4:
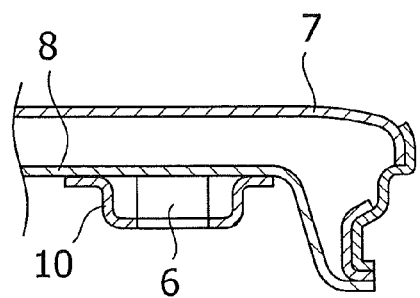
FIG. 4 is a sectional view showing a location in which a retractor anchor part is provided in a side vehicle body structure in accordance with an embodiment of the present invention.

On the other hand, as shown in FIG. 4, the rear pillar 10 has a hut-shaped horizontal cross section in the location of the space S, and by the joint to the quarter panel 8, this location is formed into a closed cross section shape. The rear pillar 10 is provided with the retractor 6, and the retractor 6 is housed in the portion having the closed cross section shape. Therefore, the rear pillar 10 plays a role as a part for improving the mounting strength of the shoulder anchor part 2, and at the same time, improving the mounting strength of the retractor anchor part 3, so that a strength member for the retractor anchor part 3 need not be used.

Also, as shown in FIG. 1, the lower portion in the vehicle rear of the rear pillar 10 is extended toward the vehicle downside, and is joined to a wheel house inner panel 11 by spot welding. Thereby, the structure is made such that the loads applied to the shoulder anchor part 2 and the retractor anchor part 3 can be distributed to the wheel house inner panel 11.

On the vehicle to which the side vehicle body structure in accordance with the embodiment of the present invention is applied, when a load is applied from the vehicle front, the inertia load of an occupant on a rear seat is received by the seat belt 1, and the shoulder anchor part 2 receives the loads F directed to the vehicle front and the vehicle downside as indicated by arrow marks in FIGS. 2 and 3, the shoulder anchor 4 moves to the vehicle front. Accordingly, the side body outer panel 7 is deformed. By this deformation of the side body outer panel 7, the loads F can be distributed by the deformation amount. As the result, the deformation of the shoulder anchor part 2 is reduced.

Also, when the shoulder anchor 4 moves to the vehicle front, the upper portion of the rear pillar 10 tends to be deformed toward the vehicle front as the result of this movement. However, since the foot portion of the rear pillar 10 achieves an effect of restraining the deformation, the deformation of the shoulder anchor part 2 is reduced.

Thus, in the side vehicle body structure in accordance with the embodiment of the present invention, the rear end part 9a of the shoulder reinforcement 9 provided in the shoulder anchor part 2 is extended to the joint portion of the side body outer panel 7 and the quarter panel 8, and the rear end part 9a of the shoulder reinforcement 9, the side body outer panel 7, and the quarter panel 8 are joined together by spot welding in the state in which the three elements are lapped together. Therefore, the strength of the shoulder anchor part 2 can be improved, and the deformation of the shoulder anchor part 2 can be restrained by the distribution of the load F applied to the shoulder anchor part 2.

Also, in the side vehicle body structure of this embodiment, the shoulder reinforcement 9 is joined by spot welding to the rear pillar 10 provided just under the shoulder anchor part 2. Therefore, since the thick sheets are connected to each other, the strength of the shoulder anchor part 2 can be improved greatly, and also the shoulder anchor part 2 can be prevented from falling when a load is applied to the vehicle front. Moreover, in the side vehicle body structure of this embodiment, the rear pillar 10 is formed so that the side face shape thereof in the front-and-rear direction of vehicle is curved in a chevron shape toward the vehicle front, and by the joint of the rear pillar 10 and the quarter panel 8, the lower portion of the shoulder anchor part 2 is formed into a closed cross section shape. Therefore, the load applied to the shoulder anchor part 2 can be received by the whole of the closed cross section portion, so that the deformation of the shoulder anchor part 2 can be restrained by the maximum utilization of the rear pillar 10 having rigidity.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. A side vehicle body structure having a shoulder anchor part for a seat belt, comprising:
    a shoulder reinforcement member comprising a rear end part and a lower end part;
    a side body outer panel;
    a quarter panel; and
    a rear pillar provided just under the shoulder anchor part;
    wherein under the shoulder anchor part, the quarter panel is spaced apart from the rear pillar and bent toward the vehicle outside to form a space between the quarter panel and the rear pillar,
    wherein the rear pillar is curved in a convex shape toward the vehicle front in side view, wherein the rear pillar has a hut-shaped horizontal cross section in the location of the space between the quarter panel and the rear pillar, wherein the rear pillar and the quarter panel are joined such that the lower portion of the shoulder anchor part is formed into a closed cross section shape, wherein, by the joint to the quarter panel, the location of the space is formed into a closed cross section shape, and wherein a retractor is housed in the portion having the closed cross section shape,
    wherein the rear end part of the shoulder reinforcement member extends to a joined portion of the side body outer panel and the quarter panel,
    wherein the rear end part of the shoulder reinforcement, the side body outer panel, and the quarter panel are joined together such that the rear end part of the shoulder reinforcement is disposed between the side body outer panel and the quarter panel,
    wherein the lower end part of the shoulder reinforcement is bent along the quarter panel and is joined to an upper end part of the rear pillar with the quarter panel being interposed therebetween, and
    wherein the shoulder reinforcement is joined to the rear pillar at the shoulder anchor part.

* * * * *